3,835,113
PREPARATION OF VISCOSE
Noel I. Burke and Harold R. Coleman, Danville, Ill., assignors to Tee-Pak, Inc., Chicago, Ill.
No Drawing. Filed Dec. 26, 1972, Ser. No. 318,065
Int. Cl. C08b 9/00
U.S. Cl. 260—216                                              5 Claims

ABSTRACT OF THE DISCLOSURE

An improvement in a process for preparing cellulose xanthate comprises reacting alkali cellulose crumb at a temperature of from 25–35° C. for a period of time from 40–75 minutes and at an initial reactor pressure from about 100–700 mm. mercury absolute with a mixture of carbon disulfide and carbonyl sulfide, the proportion of carbonyl sulfide being from 2.5–10 mole percent for the mixture and a total mole proportion of from 1–1.5 moles per kilogram of alkali cellulose crumb. The cellulose xanthate can be produced in substantially less time than conventional processes and the resulting viscose has a much lower viscosity than conventional viscose.

DISCUSSION OF THE PRIOR ART

Viscose has been known as an intermediate in the preparation of cellulose composition for about 70 years. Sodium cellulose xanthate, an intermediate for forming viscose, was discovered by Cross and Bevin in 1892. It results from the reaction of carbon disulfide and alkali cellulose.

In the conventional preparation of viscose for the manufacture of artificial casings and processing of meat emulsions therein, a chemically pure cellulose, typically of a wood or cotton source, is contacted with 19% aqueous caustic soda for a period of about one hour. This step is referred to as steeping. After steeping, the caustic is drained and the board pressed to remove excess caustic soda. The force applied to the board in the pressing operation is sufficient to give a pressed weight ratio of about three pounds wet pulp per one pound of original cellulose board. Thereafter, the pressed board is sent to a shredder, forming into what is referred to as alkali cellulose crumb. The degree of polymerization (D.P.) of the alkali crumb is from about 450–550. After shredding, the alkali crumb is allowed to age for a period of about ten hours. Then, it is converted to cellulose xanthate crumb by reacting with carbon disulfide in a proportion of about 15.9 moles carbon disulfide per 10,000 g. of alkali cellulose crumb. The reaction is carried out in a baratte (initially vented and then closed) at substantially atmospheric pressure and at a temperature of 28–30° C. The reaction is completed in a period of time of from about 2–3 hours. After the reaction, the cellulose xanthate crumb is slurried with an aqueous dilute caustic soda in a proportion to yield from about 7–8% cellulose and a caustic soda content of from about 5–6% to form viscose. The viscose then is disintegrated in a hammer mill, breaking any lumps remaining after dissolving the alkali cellulose crumb in caustic, filtered, and deaerated. The viscose usually has a viscosity of from about 60–70 seconds measured by the falling ball method and this corresponds to a viscosity of about 250–300 poises.

To convert the viscose solution into a cellulose film for making artificial casings, the viscose is extruded through an annular die forming a tubular casing. The extruded casing is coagulated substantially immediately by passing the extruded casing into a bath containing about 250 g. per liter sodium sulfate and from about 100–135 g. per liter of sulfuric acid and water. The casing then is plasticized by passing through a glycerin-water bath. The plasticized film containing from about 65–70% water then is passed through a dryer to remove a substantial proportion of the water, producing a finished product having a water content of from about 8–10%. The dry tensile strength of the tubular casing generally is from about 20,000–25,000 p.s.i. and the strength of the film when immersed into water and withdrawn is from about 3,000–4,000 p.s.i.

It has also been proposed to prepare artificial tubular casings from a caustic solution of cellulose carbonate as opposed to a viscose solution containing cellulose xanthate. However, as of this time, cellulose carbonate has not been made, and therefore, commercial films are not available on the market. Apparently, the carbonate radical does not form by the reaction of carbon dioxide and cellulose.

It has also been proposed to react alkali cellulose crumb with carbonyl sulfide for the purpose of producing a carbonyl sulfide derivative of cellulose as opposed to a cellulose xanthate. However, the operating temperatures necessary for forming the carbonyl sulfide derivative of cellulose by reacting carbonyl sulfide with alkali cellulose crumb are substantially lower than that required for forming the xanthate. For example, the temperatures normally used for forming the carbonyl sulfide derivative in the reaction is from about −20–0° C. If higher temperatures are employed or the carbonyl sulfide derivative is exposed to high temperatures, the derivative decomposes and unacceptable vacuum for spinning into tubular film generally results. Lower temperatures in the process are not preferred as this requires refrigeration.

It has been proposed by Phillip in East German Pat. No. 14,254 that the xanthation time and the viscosity of resulting viscose prepared by dissolving cellulose xanthate in caustic soda can be substantially reduced by carrying out the xanthation reaction with carbon disulfide in the presence of carbonyl sulfide. More specifically, Phillip disclosed that cellulose xanthate could be prepared by incorporating about 5% carbonyl sulfide basis the carbon disulfide in the reaction in a period of time of about 20 minutes. This xanthate possessed the desired features indicated. Investigators have attempted to duplicate the Phillip process and have found its duplication to be difficult. The results from such attempted duplication produce a cellulose xanthate which forms an unsatisfactory viscose to be commercially used for the manufacture of tubular casings.

SUMMARY OF THE INVENTION

This invention relates to an improvement in a process for preparing cellulose xanthate.

The improvement comprises the steps of lowering the pressure in a baratte to about 100–700 mm. Hg absolute and then introducing and reacting about 1 kilogram of alkali cellulose crumb with from about 1–1.5 moles of a mixture of carbon disulfide and carbonyl sulfide per kilogram of alkali cellulose crumb, the carbonyl sulfide constituting from about 2.5–10 mole percent of the mixture for a period of time from about 40–75 minutes and at a temperature of 25–35° C. In carrying out the process, it is important to lower the baratte pressure to about 100–700 mm. mercury absolute then introduce the appropriate quantities of carbon disulfide and carbonyl sulfide substantially simultaneously together by premixing the two prior to introduction to the reactor for reasons given hereinafter.

Advantages of this process include the ability to produce desired xanthate sulfur concentration in the cellulose xanthate with a lower mole feed of carbon disulfide than conventionally used, the ability to produce a viscose having desirable filterability which is at least equal to or better than the filterability of viscose solutions produced by Phillip or by the conventional viscose process, the ability to achieve a lower viscosity viscose than was achieved by the conventional viscose process with the same cellulose xanthate sulfur concentration, the ability to reduce the reaction time for conversion of alkali cellulose to cellulose xanthate from that of the conventional viscose process, and the ability to extrude tubular casings from viscose produced from the cellulose xanthate having desirable dry and wet strength properties. Additionally, there generally is less entrainment of air in the solution which might cause pinholes or air bubbles when the film is spun for casing manufacture.

Generally, the reaction of carbon disulfide proceeds at a desirable rate when the carbonyl sulfide is present in a proportion of about 2.5–10 mole percent. For optimum results, the carbonyl sulfide content should be from about 4–6 mole percent mixture. This range provides for a desirable reaction time, a desirable conversion of the alkali cellulose to cellulose xanthate in lower reaction time, and a desirable viscose solution.

In the conversion of alkali cellulose crumb to cellulose xanthate, the reaction typically is carried out at a temperature between about 20–35° C. When the temperature is reduced below about 20° C. the reaction time generally becomes excessive and impractical for commercial purposes, e.g., 24 hours or longer. When the temperature is increased above about 35° C., decomposition of the cellulose xanthate generally occurs almost as fast as it is made and the resulting product is undesirable for making regenerated cellulose films. For practical purposes, the temperature of reaction for converting the cellulose to cellulose xanthate is from about 25–30° C. This operating temperature gives desirable reaction times and desirable product in terms of its physical properties.

To achieve desirable conversion of the alkali cellulose to the cellulose xanthate in appropriate reaction times with lower molar feed quantities of carbon disulfide, it is important to add the carbon disulfide and carbonyl sulfide to the reactor substantially simultaneously. Carbonyl sulfide is soluble in carbon disulfide and can easily be introduced to the reactor along with the carbon disulfide. When the carbonyl sulfide is introduced first, followed by the addition of carbon disulfide, higher mole concentrations of carbonyl sulfide are generally required to achieve similar conversion of the cellulose crumb to cellulose xanthate in desired reaction time. When the carbon disulfide is introduced before the carbonyl sulfide, even under reduced pressure, longer reaction times are required to achieve desirable sulfur content and often higher viscosity viscose is produced. Additionally, a higher mole concentration of carbon disulfide often is required to achieve the same conversion of cellulose crumb to cellulose xanthate in the same length of time.

Pressure in the baratte is important to achieve desirable sulfur content in the cellulose xanthate at reduced reaction times. When the pressure in the baratte is reduced to 700 mm. and below, desirable conversion of the cellulose to cellulose xanthate and viscose of desirable viscosity is achieved. A pressure of about 700 mm. Hg in the baratte corresponds to a mole concentration of about 45% carbon disulfide in the gas phase excluding the vapor pressure of carbonyl sulfide and yet maintains a fraction in the liquid phase. Conventional processes usually result in a gas concentration of about 36% carbon disulfide. Generally, the carbon disulfide mole portion in the gas phase is from about 45–85%, excluding the portion of carbonyl sulfide in the initial pressure of 100–700 mm. Hg.

As pointed out before, an interesting observation about the reaction of carbon disulfide with the cellulose crumb is that the conversion of cellulose to cellulose xanthate with lower feed quantities of carbon disulfide can be achieved by employing reduced pressure in the baratte. This is contrary to what one would ordinarily expect. One would expect desirable conversion of cellulose to cellulose xanthate and faster times would be achieved by increasing the pressure. But, for effecting the conversion of cellulose crumb to cellulose xanthate, it has been demonstrated that reduced pressure using carbon disulfide and carbonyl sulfide in combination and where they are introduced simultaneously to a reactor, desirable conversion to cellulose xanthate is effected in a shorter period of time, a better viscose and resultant casing is produced. In a commercial plant where cellulose xanthate is produced by the reaction of carbon disulfide and alkali crumb in the absence of carbonyl sulfide and in an unvented baratte initially at 760 mm. Hg, it generally takes about 15.9 moles carbon disulfide to yield a cellulose xanthate having a concentration of about 14.3% sulfur from 10,000 g. alkali cellulose. This same percentage of sulfur in the cellulose xanthate can be achieved by this invention using as low as 12–13 moles or roughly 25% less than that required in the plant using atmospheric pressure and no carbonyl sulfide.

The ability to convert the cellulose to cellulose xanthate with a lower mole feed of carbon disulfide is extremely advantageous in the manufacture of articles made from cellulose casings because it means that at least 25% of the feed carbon disulfide, now used on a plant scale, can be eliminated. This smaller equipment, pumps, etc., can be employed in the plant. Also, this generally means reduced equipment costs for the recovery of carbon disulfide and less costs for the production of the cellulose xanthate.

The following examples are provided to illustrate the preferred embodiment of this invention and not intended to restrict the scope thereof. All temperatures are expressed as degrees centigrade, all parts are parts by weight, and all percentages are mole percent unless otherwise specified.

EXAMPLE I

Conversion of alkali cellulose to cellulose xanthate was made using a 10,000 g. sample of alkali cellulose crumb containing about 3460 g. of cellulose. The alkali crumb for making cellulose xanthate was made by treating a chemically pure cellulosic board having about 50% wood-50% cotton by contacting with 19% aqueous caustic soda for a period of about one hour. After this steeping operation, the caustic was drained from the cellulosic board and then squeezed in a press to produce a pressed board having a weight ratio of three pounds wet pulp per one pound original cellulose board. Thereafter, the pressed board was sent to a shredder where it was shredded and converted into alkali cellulose crumb. The degree of polymerization of the alkali crumb was about 450–500. The crumb then was allowed to age for a period of about 10 hours.

Conversion of the alkali cellulose crumb to cellulose xanthate was accomplished by charging the 10,000 g. sample of alkali cellulose crumb containing the 3460 g. of cellulose to an unvented baratte. The reactor contents were kept at a temperature of from about 28–30° C. The baratte was initially maintained at a pressure of 760 mm. Hg absolute in order to duplicate a commercial process. Fifteen moles of carbon disulfide were charged to the reactor and the reaction allowed to continue for a period of from about 120 minutes.

The xanthate sufur content of the cellulose xanthate produced by the reaction was about 14.2%. A viscose solution was prepared by dissolving the cellulose xanthate in aqueous caustic soda in an amount sufficient to give a cellulose content of 7.7% and a caustic soda content of 6%. The aged falling ball viscosity of the resulting viscose was about 68 seconds and the tensile strength of dry tubular casing over a one inch section was 22,000 p.s.i. and had a wet strength of about 4,200, which is then withdrawing and measuring.
measured by immersing the dry casing into water and

EXAMPLE II

Conversion of a 10,000 g. sample of alkali cellulose crumb was accomplished by charging the crumb prepared in the same manner as Example I to an unvented baratte. The temperature was maintained at about 28–30° C. In this reaction, the pressure of the baratte was reduced to about 120 mm. mercury absolute. Then, 13.1 moles of carbon disulfide and carbonyl sulfide having about 4 mole percent carbonyl sulfide was introduced to the reactor. The carbon disulfide was introduced prior to the introduction of carbonyl sulfide. The reaction after introduction of both reactants was allowed to proceed for about 20 minutes. The sulfur content of the cellulose xanthate produced was about 5%. A viscose solution produced by dissolving the cellulose xanthate in caustic soda in an amount sufficient to produce identical cellulose and caustic properties as was done in Example I had an aged falling ball viscosity of 133 seconds. This was substantially higher than the plant viscosity of 68 seconds. The dry tensile strength of tubular casing prepared from the viscose was about 15,000 p.s.i. and the casing had a wet strength of about 2,700 p.s.i.

EXAMPLE III

Conversion of a 10,000 g. sample of alkali cellulose crumb containing about 3,460 g. of cellulose was accomplished by charging the crumb to an unvented baratte. The contents were kept at a temperature of from about 28–30° C. under agitation. The baratte was reduced in pressure to 390 mm. mercury absolute. Then, 13 moles of carbon disulfide and carbonyl sulfide containing about 4 mole percent carbonyl sulfide was added to the baratte. In this case, the carbonyl sulfide was added prior to the addition of carbon disulfide. The reaction was allowed to continue for a period of about 40 minutes. The xanthate sulfur content of the resulting cellulose xanthate was about 14.7%. A viscose solution produced by dissolving the cellulose xanthate in caustic soda to produce identical cellulose and caustic proportions in like manner as was done in Example I had an aged falling ball viscosity of about 44.6 seconds. The viscose, when extruded into a tubular casing, had a dry tensile strength of 16,900 p.s.i. and a wet tensile strength of 2,600 p.s.i.

EXAMPLE IV

Conversion of a 10,000 g. sample of alkali cellulose crumb containing about 3,460 g. of cellulose was accomplished by charging the crumb to an unvented baratte. The contents were kept at a temperature of from about 28–30° C. The baratte was reduced in pressure to about 418 mm. mercury absolute. Then, 15 moles of carbon disulfide and carbonyl sulfide containing about 4.5% carbonyl sulfide was introduced to the baratte. The carbonyl sulfide was introduced prior to the addition of the carbon disulfide. The reaction was allowed to continue for a period of about 50 minutes and the cellulose xanthate sulfur content was about 15.1%. Viscose, produced by dissolving the cellulose xanthate in caustic soda in like manner as in Example I, had an aged falling ball viscosity of about 48.3 seconds. The viscose, when extruded into a tubular casing, had a dry tensile strength of 20,900 p.s.i. and a wet tensile strength of 3,100 p.s.i.

EXAMPLE V

Conversion of a 10,000 g. sample of alkali cellulose crumb containinng about 3,460 g. of cellulose was accomplished by charging the crumb to an unvented baratte. The contents were kept at a temperature of from about 28–30° C. under agitation. The baratte was reduced in pressure to about 620 mm. mercury absolute. Then, 11 moles of a mixture of carbon disulfide and carbonyl sulfide containing about 6.5% carbonyl sulfide was introduced into the baratte. Both the carbon disulfide and carbonyl sulfide were introduced substantially simultaneously to the baratte, and this was accomplished by dissolving the carbonyl sulfide in the carbon disulfide. The reaction was allowed to continue for a period of about 60 minutes. The cellulose xanthate sulfur content was about 15.4%. A viscose solution produced by dissolving the cellulose xanthate in caustic soda in proportions as to give identical cellulose and caustic content as in Example I had a falling ball viscosity of about 53.4 seconds. The viscose when extruded into a tubular casing had a dry tensile strength of about 23,300 p.s.i. and a wet tensile strength of about 3,000 p.s.i.

EXAMPLE VI

Conversion of a 10,000 g. sample of alkali cellulose crumb containing about 3,460 g. of cellulose was accomplished by charging the crumb to an unvented baratte. The contents were kept at a temperature of from about 28–30° C. under agitation. The pressure of the baratte was reduced to about 465 mm. mercury absolute. Then, 11 moles of a mixture of carbon disulfide and carbonyl sulfide containing about 7.5% carbonyl sulfide was introduced to the baratte. Both the carbon disulfide and carbonyl sulfide were introduced substantially simultaneously to the reactor by dissolving the carbonyl sulfide in the carbon disulfide. The reaction was allowed to continue for a period of about 60 minutes. The cellulose xanthate sulfur content of the resulting product was about 15.0%. A viscose solution produced by dissolving the cellulose xanthate in caustic soda in a proportion to give the same cellulose and caustic proportion as in Example I had a falling ball viscosity of about 62 seconds. Viscose, when extruded into a casing, had a dry tensile strength of about 26,000 p.s.i. and a wet tensile strength of about 3,000 p.s.i.

EXAMPLE VII

Conversion of a 10,000 g. sample of alkali cellulose crumb containing about 3,460 g. of cellulose was accomplished by charging the crumb to an unvented baratte. The contents were kept at a temperature of from about 28–30° C. under agitation. The pressure in the baratte was reduced to about 687 mm. mercury absolute. Then, 12.5 moles of a mixture of carbon disulfide and carbonyl sulfide containing about 7.5% carbonyl sulfide was introduced to the reactor. Both the carbon disulfide and carbonyl sulfide were introduced substantially simultaneously to the baratte by dissolving the carbonyl sulfide and carbon disulfide. The reaction was allowed to continue for about 65 minutes. The cellulose xanthate sulfur content produced from the reaction was about 14.8%. A viscose solution produced by dissolving the cellulose xanthate in a proportion of caustic soda had an aged falling ball viscosity of about 42.8 seconds. The concentration of cellulose and caustic was essentially the same as that in Example I. Viscose, when extruded into a tubular casing, had a dry tensile strength of 26,100 p.s.i. and a wet tensile strength of 2,900 p.s.i.

EXAMPLE VIII

Conversion of a 10,000 g. sample of alkali cellulose crumb containing about 3,460 g. of cellulose was accomplished by charging the crumb to an unvented baratte. The contents were kept at a temperature of from about 28–30° C. under agitation. The pressure in the baratte was reduced to about 595 mm. mercury absolute. Then, about 12 moles of a mixture of carbon disulfide and carbonyl sulfide containing about 7.5% carbonyl sulfide were introduced substantially simultaneously to the baratte. This was done by dissolving the carbonyl sulfide in the carbon disulfide. The reaction was allowed to proceed for a period of about 70 minutes, and the cellulose xanthate produced at a sulfur content of about 15.1%. Viscose, produced by dissolving the cellulose xanthate produced in caustic soda in like manner as in Example I, had an aged falling ball viscosity of about 51.3 seconds. The viscose, when extruded into a tubular casing, had a dry tensile strength of about 25,200 p.s.i. and a wet tensile strength of 2,900 p.s.i.

EXAMPLE IX

Conversion of a 10,000 g. sample of alkali cellulose crumb containing about 3,460 g. of cellulose was accomplished by charging the crumb to an unvented baratte. The contents were kept at a temperature of from about 28–30° C. under agitation. The baratte was reduced in pressure to about 125 mm. mercury absolute. Then, 15 moles of carbon disulfide and carbonyl sulfide, the carbonyl sulfide being present in a proportion of about 6 mole percent of the carbon disulfide, were added to the baratte. The carbon disulfide was introduced prior to the addition of the carbonyl sulfide. The reaction between the carbon disulfide and cellulose crumb was allowed to continue for about 40 minutes. The resulting cellulose xanthate produced had a sulfur content of 20.2%. Viscose, produced by dissolving the cellulose xanthate in caustic soda in a proportion to produce a caustic and cellulose concentration identical to Example I, had an aged falling ball viscosity of about 89 seconds. The viscose, when extruded into a tubular casing, had a dry tensile strength of about 16,000 p.s.i. and a wet tensile strength of about 3,200 p.s.i.

What is claimed is:

1. In a process for producing cellulose xanthate from alkali cellulose crumb having sufficient xanthate sulfur concentration for making viscose having sufficiently low viscosity for making artificial sausage casing, by reacting said crumb with carbon disulfide in a reactor, the improvement which comprises the steps of:

reducing the pressure in said reactor to between about 100–700 mm. Hg absolute, introducing from about 2.5–10 mole percent of carbonyl sulfide with said carbon disulfide, adding from about 1–1.5 moles of mixture of carbon disulfide and carbonyl sulfide per 1 kilogram alkali cellulose crumb, said carbon disulfide-carbonyl sulfide being introduced substantially simultaneously, maintaining the reaction temperature between about 20–35° C., and maintaining said reaction for a period of time from about 40–75 minutes.

2. The process of Claim 1 wherein the pressure in said reactor prior to introduction of said carbon disulfide and carbonyl sulfide is 100–600 mm. Hg.

3. The process of Claim 2 wherein the temperature for reaction is from about 25–30° C.

4. The process of Claim 3 wherein the mole percent of carbonyl sulfide is from about 4–6%.

5. The process of Claim 3 wherein the proportion of carbon disulfide in the gas phase after introduction of said mixture is from about 45–85%.

References Cited

UNITED STATES PATENTS

| | | | |
|---|---|---|---|
| 1,862,592 | 6/1932 | Goth | 260—217 |
| 2,592,355 | 4/1952 | Tachikawa | 260—216 |
| 2,762,795 | 9/1956 | Schlosser et al. | 260—217 |
| 2,992,880 | 7/1961 | Toms | 260—216 |

OTHER REFERENCES

Chemical abstracts, volume 53, No. 11, June 10, 1959, p. 10761e.

M. J. WELSH, Primary Examiner

R. W. GRIFFIN, Assistant Examiner

U.S. Cl. X.R.

260—217; 264—196, 197